(12) United States Patent
Vadapalli et al.

(10) Patent No.: US 12,256,231 B2
(45) Date of Patent: Mar. 18, 2025

(54) CELL SEARCH DURING DYNAMIC SPECTRUM SHARING (DSS) OPERATION

(71) Applicant: QUALCOMM Incorporated, San Diego, CA (US)

(72) Inventors: Syam Pavan Vadapalli, Visakhapatnam (IN); Ankammarao Ravuvari, Hyderabad (IN); Roop Sagar Inakollu, Nellore (IN)

(73) Assignee: QUALCOMM Incorporated, San Diego, CA (US)

( * ) Notice: Subject to any disclaimer, the term of this patent is extended or adjusted under 35 U.S.C. 154(b) by 445 days.

(21) Appl. No.: 17/705,056

(22) Filed: Mar. 25, 2022

(65) Prior Publication Data

US 2023/0319581 A1    Oct. 5, 2023

(51) Int. Cl.
| | |
|---|---|
| *H04W 16/14* | (2009.01) |
| *H04W 4/06* | (2009.01) |
| *H04W 24/10* | (2009.01) |
| *H04W 56/00* | (2009.01) |

(52) U.S. Cl.
CPC ............. *H04W 16/14* (2013.01); *H04W 4/06* (2013.01); *H04W 24/10* (2013.01); *H04W 56/001* (2013.01)

(58) Field of Classification Search
CPC ........ H04W 16/14; H04W 4/06; H04W 24/10
See application file for complete search history.

(56) References Cited

U.S. PATENT DOCUMENTS

| | | | | |
|---|---|---|---|---|
| 2018/0367985 | A1* | 12/2018 | Novlan | H04W 56/0005 |
| 2019/0069226 | A1* | 2/2019 | Lee | H04W 48/18 |
| 2020/0366360 | A1* | 11/2020 | Kotecha | H04J 11/0076 |
| 2023/0016918 | A1* | 1/2023 | Marupaduga | H04W 72/541 |

FOREIGN PATENT DOCUMENTS

| | | | | |
|---|---|---|---|---|
| WO | WO-2020190195 | A1 * | 9/2020 | H04W 16/14 |
| WO | WO-2023174519 | A1 * | 9/2023 | |

OTHER PUBLICATIONS

"QUALCOMM: Snapdragon 888 5G Mobile Platform", 2020, pp. 1-10.

* cited by examiner

*Primary Examiner* — Jamal Javaid
*Assistant Examiner* — Ryan C Kavleski
(74) *Attorney, Agent, or Firm* — Seyfarth Shaw LLP (57) ABSTRACT

A method of wireless communication by a user equipment (UE) includes receiving a configuration for dynamic spectrum sharing (DSS) operation where a first radio access technology (RAT) and a second RAT share spectrum. The configuration includes channel parameters associated with the first RAT. The method includes determining, based on the configuration, a first set of synchronization signal blocks (SSBs) that will not be transmitted via the second RAT and a second set of SSBs that will be transmitted via the second RAT. The method further includes refraining from performing a cell search on the first set of SSBs that was determined to not be transmitted via the second RAT. The method includes performing the cell search on the second set of SSBs that was determined to be transmitted via the second RAT.

24 Claims, 7 Drawing Sheets

CELL SEARCH DURING DYNAMIC SPECTRUM SHARING (DSS) OPERATION

FIELD OF THE DISCLOSURE

The present disclosure relates generally to wireless communications, and more specifically to a method and apparatus for cell search during dynamic spectrum sharing (DSS) operation.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In aspects of the present disclosure, a method of wireless communication by a user equipment (UE) includes receiving a configuration for dynamic spectrum sharing (DSS) operation where a first radio access technology (RAT) and a second RAT share spectrum. The configuration includes channel parameters associated with the first RAT. The method also includes determining, based on the configuration, a first set of synchronization signal blocks (SSBs) that will not be transmitted via the second RAT and a second set of SSBs that will be transmitted via the second RAT. The method further includes refraining from performing a cell search on the first set of SSBs that was determined to not be transmitted via the second RAT. The method also includes performing the cell search on the second set of SSBs that was determined to be transmitted via the second RAT.

Other aspects of the present disclosure are directed to an apparatus for wireless communication by a user equipment (UE). The apparatus has a memory and one or more processors coupled to the memory. The processor(s) is configured to receive a configuration for dynamic spectrum sharing (DSS) operation where a first radio access technology (RAT) and a second RAT share spectrum. The configuration includes channel parameters associated with the first RAT. The processor(s) is also configured to determine, based on the configuration, a first set of synchronization signal blocks (SSBs) that will not be transmitted via the second RAT and a second set of SSBs that will be transmitted via the second RAT. The processor(s) is further configured to refrain from performing a cell search on the first set of SSBs that was determined to not be transmitted via the second RAT. The processor(s) is also configured to perform the cell search on the second set of SSBs that was determined to be transmitted via the second RAT.

Other aspects of the present disclosure are directed to an apparatus for wireless communication by a user equipment (UE). The apparatus includes means for receiving a configuration for dynamic spectrum sharing (DSS) operation where a first radio access technology (RAT) and a second RAT share spectrum. The configuration includes channel parameters associated with the first RAT. The apparatus also includes means for determining, based on the configuration, a first set of synchronization signal blocks (SSBs) that will not be transmitted via the second RAT and a second set of SSBs that will be transmitted via the second RAT. The apparatus further includes means for refraining from performing a cell search on the first set of SSBs that was determined to not be transmitted via the second RAT. The apparatus also includes means for performing the cell search on the second set of SSBs that was determined to be transmitted via the second RAT.

In other aspects of the present disclosure, a non-transitory computer-readable medium having program code recorded thereon is disclosed. The program code is executed by a processor and includes program code to receive a configuration for dynamic spectrum sharing (DSS) operation where a first radio access technology (RAT) and a second RAT share spectrum. The configuration includes channel parameters associated with the first RAT. The program code includes program code to determine, based on the configuration, a first set of synchronization signal blocks (SSBs) that will not be transmitted via the second RAT and a second set of SSBs that will be transmitted via the second RAT. The program code further includes program code to refrain from performing a cell search on the first set of SSBs that was determined to not be transmitted via the second RAT. The program code also includes program code to perform the cell search on the second set of SSBs that was determined to be transmitted via the second RAT.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Dynamic spectrum sharing (DSS) is a technique for migrating spectrum from one radio access technology (RAT), such as long term evolution (LTE), to a second RAT, such as new radio (NR). With DSS, NR and LTE may share the same spectrum by reframing existing LTE frequency division duplexed (FDD) bands to deploy NR. The shared spectrum is dynamically assigned based on traffic conditions in each technology.

To enable DSS, a user equipment (UE) advertises to the network the UE's support for DSS. If the network does not have available dedicated spectrum for NR, the network configures the relevant parameters for DSS operation. The relevant parameters may include a multicast broadcast single frequency network (MBSFN) configuration (e.g., location and repetition of MBSFN subframes).

NR networks transmit synchronization signal blocks (SSBs) to synchronize the UEs with the NR network. Each SSB of a set of SSBs may be configured for transmission in a particular subframe. When operating with DSS, the NR network may not be able to transmit all of its SSBs. For example, the NR cell can only transmit a set of SSBs that fall in the MBSFN subframes. This is a specification for DSS operation due to priority of certain LTE signaling.

The network may configure the UE to measure intra-frequency cells and then send measurement reports for those intra-frequency cells. The network can transmit the configuration information to the UE by including frequency and timing information. The UE performs cell searches and measurements based on the received timing and frequency information. If the conditions and thresholds for the cell measurements are met, the UE transmits a measurement report to the network.

If the network does not configure the UE with an optional ssb-ToMeasure field when requesting the cell search, the UE performs a search and measurement on all SSBs. Performing a cell search on SSBs that are not transmitted by the network is undesirable, however, and leads to unwanted processing and power waste. That is, if a UE attempts to decode SSBs that are not present, the UE performs unnecessary cell searches.

According to aspects of the present disclosure, a UE refrains from performing cell searches on any SSBs that are not transmitted by the network when operating in DSS mode. For example, if an NR cell is operating in DSS mode with MBSFN configured for subframe 1, the only SSBs the NR cell transmits are SSBs with indexes 2 and 3 because the SSBs with indexes 2 and 3 are assigned to subframe 1. In this example, the LTE network transmits priority signals in subframe 0, preventing the NR network from using subframe 0 for SSB transmission. Thus, the NR cell does not transmit the SSBs with indexes 0 and 1, which are assigned to subframe 0. By avoiding detecting the SSB 0 and SSB 1, which the NR cell does not transmit, the UE does not perform cell measurement on SSB 0 and SSB 1 of the NR cell. As a result, power savings is achieved by the UE.

Figure 1:
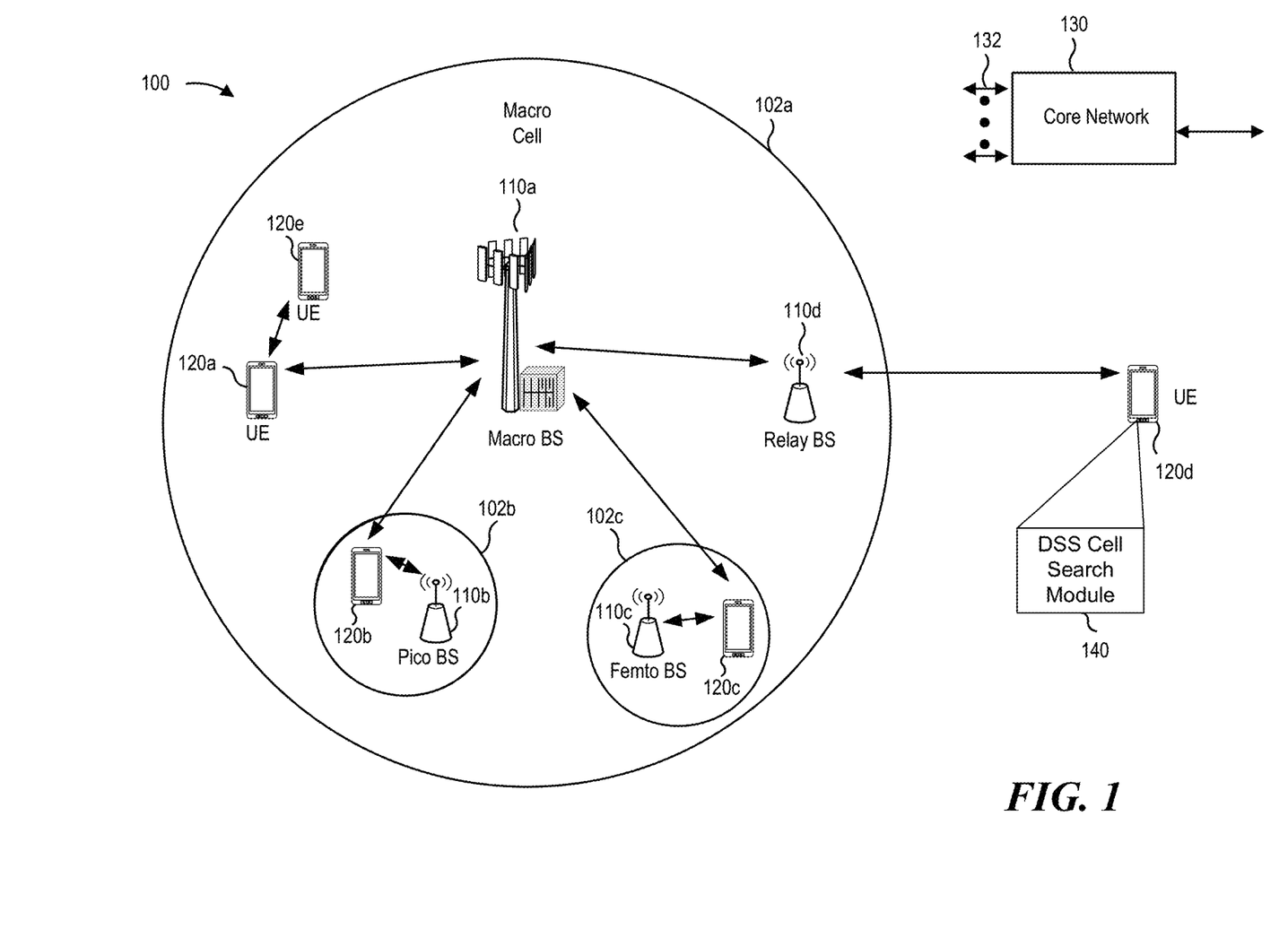
FIG. 1 is a block diagram conceptually illustrating an example of a wireless communications network, in accordance with various aspects of the present disclosure.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, an NR BS, a Node B, a gNB, a 5G Node B, an access point, a transmit and receive point (TRP), a network node, a network entity, and/or the like. A base station can be implemented as an aggregated base station, as a disaggregated base station, an integrated access and backhaul (IAB) node, a relay node, a sidelink node, etc. The base station can be implemented in an aggregated or monolithic base station architecture, or alternatively, in a disaggregated base station architecture, and may include one or more of a central unit (CU), a distributed unit (DU), a radio unit (RU), a near-real time (near-RT) RAN intelligent controller (RIC), or a non-real time (non-RT) RIC.

Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB," "base station," "NR BS," "gNB," "AP," "Node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communications between the BS 110*a* and UE 120*d*. A relay station may also be referred to as a relay BS, a relay base station, a relay, and/or the like.

The wireless network 100 may be a heterogeneous network that includes BSs of different types (e.g., macro BSs, pico BSs, femto BSs, relay BSs, and/or the like). These different types of BSs may have different transmit power levels, different coverage areas, and different impact on interference in the wireless network 100. For example, macro BSs may have a high transmit power level (e.g., 5 to 40 watts) whereas pico BSs, femto BSs, and relay BSs may have lower transmit power levels (e.g., 0.1 to 2 watts).

As an example, the BSs 110 (shown as BS 110*a*, BS 110*b*, BS 110*c*, and BS 110*d*) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120*a*, 120*b*, 120*c*) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a DSS cell search module 140. For brevity, only one UE 120d is shown as including the DSS cell search module 140. The UEs 120 may include a DSS cell search module 140. For brevity, only one UE 120d is shown as including the DSS cell search module 140. The DSS cell search module 140 may receive a configuration for dynamic spectrum sharing (DSS) operation where a first radio access technology (RAT) and a second RAT share spectrum. The configuration includes channel parameters associated with the first RAT. The DSS cell search module 140 may also determine, based on the configuration, a first set of synchronization signal blocks (SSBs) that will not be transmitted via the second RAT and a second set of SSBs that will be transmitted via the second RAT. The DSS cell search module 140 may further refrain from performing a cell search on the first set of SSBs that was determined to not be transmitted via the second RAT. The DSS cell search module 140 may also perform the cell search on the second set of SSBs that was determined to be transmitted via the second RAT.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrow band internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB)).

As indicated above, FIG. 1 is provided merely as an example. Other examples may differ from what is described with regard to FIG. 1.

Figure 2:
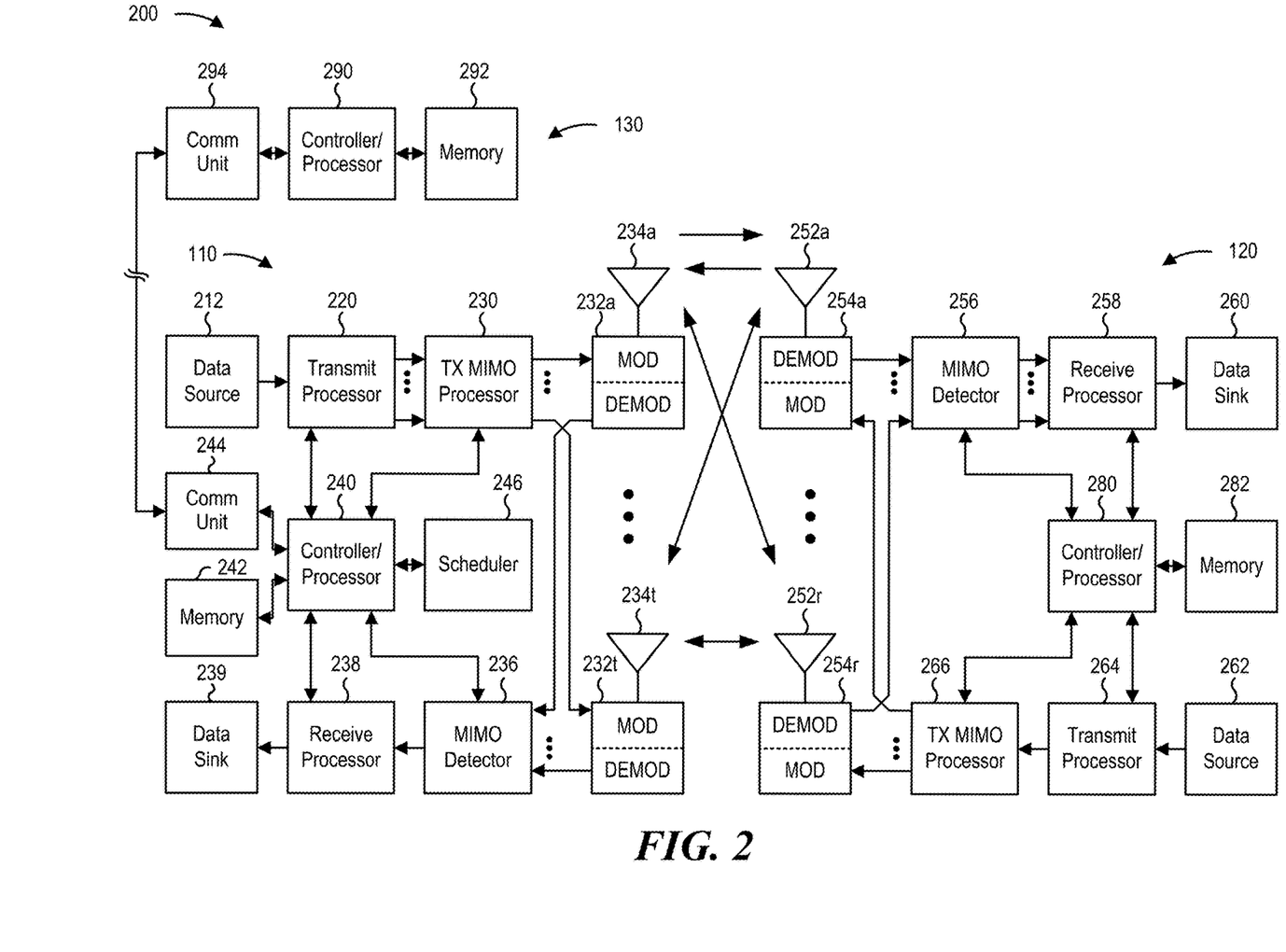
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for orthogonal frequency division multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, down-convert, and digitize) a received signal to obtain input samples. Each demodulator 254 may further process the input samples (e.g., for orthogonal frequency division multiplexing (OFDM) and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with enhanced cell search during DSS operation as described in more detail elsewhere. For example, the controller/processor 240 of the base station 110, the controller/processor 280 of the UE 120, and/or any other component(s) of FIG. 2 may perform or direct operations of, for example, the processes of FIGS. 6 and 7 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for receiving, means for determining, means for refraining and/or means for performing. Such means may include one or more components of the UE 120 or base station 110 described in connection with FIG. 2.

As indicated above, FIG. 2 is provided merely as an example. Other examples may differ from what is described with regard to FIG. 2.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), an evolved NB (eNB), an NR BS, 5G NB, an access point (AP), a transmit and receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
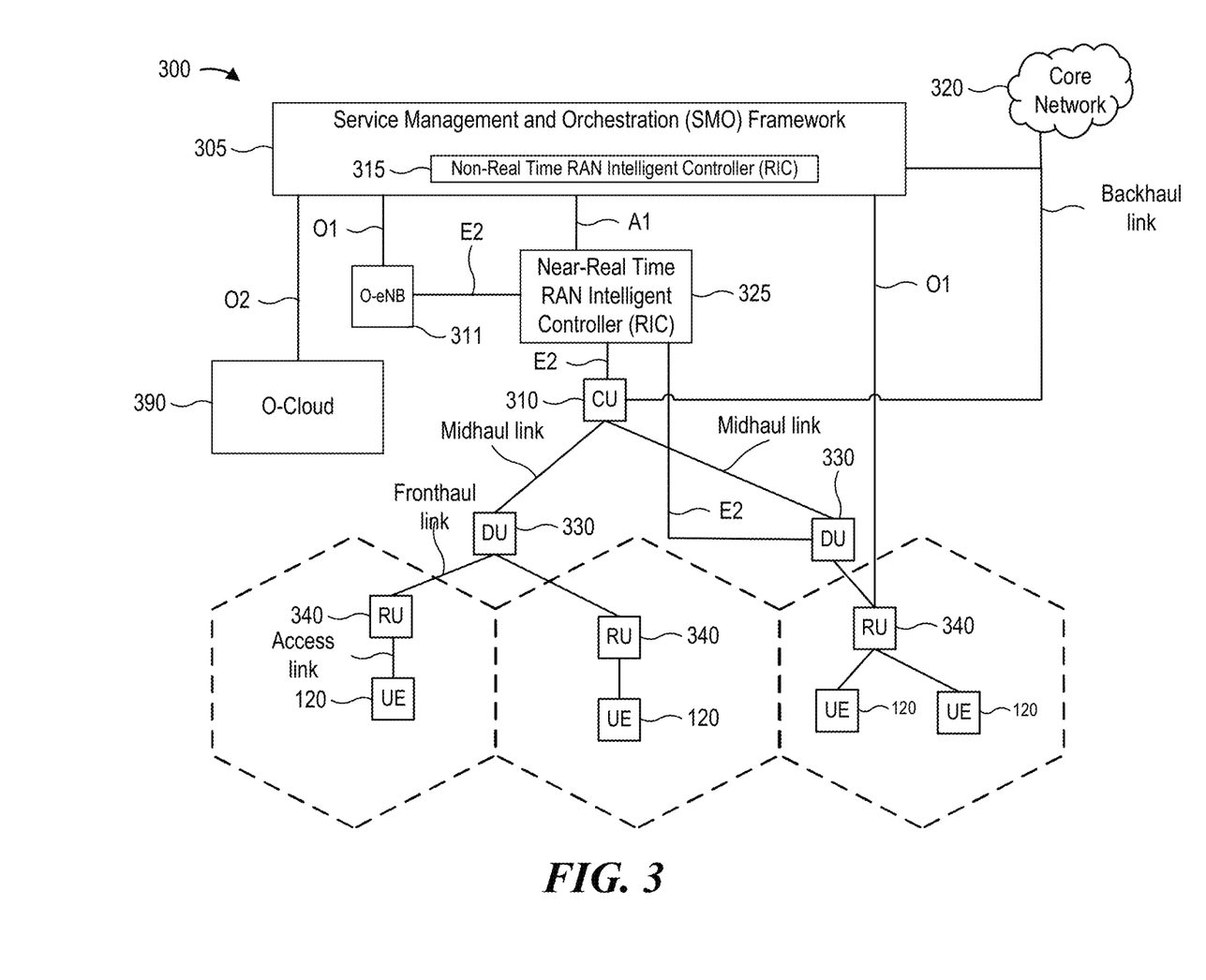
FIG. 3 is a block diagram illustrating an example disaggregated base station architecture, in accordance with certain aspects of the present disclosure

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a near-real time (near-RT) RAN intelligent controller (RIC) 325 via an E2 link, or a non-real time (non-RT) RIC 315 associated with a service management and orchestration (SMO) framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUS 310, the DUs 330, the RUs 340, as well as the near-RT RICs 325, the non-RT RICs 315, and the SMO framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bi-directionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the Third Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and near-RT RICs 325. In some implementations, the SMO Framework 305 can communicate with a hardware aspect of a 4G RAN, such as an open eNB (O-eNB) X11, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the near-RT RIC 325. The non-RT RIC 315 may be coupled to or communicate with (such as via an A1 interface) the near-RT RIC 325. The near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the near-RT RIC 325.

In some implementations, to generate AI/ML models to be deployed in the near-RT RIC 325, the non-RT RIC 315 may receive parameters or external enrichment information from external servers. Such information may be utilized by the near-RT RIC 325 and may be received at the SMO Framework 305 or the non-RT RIC 315 from non-network data sources or from network functions. In some examples, the Non-RT RIC 315 or the near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

Dynamic spectrum sharing (DSS) helps with migration of spectrum from one radio access technology (RAT), such as long term evolution (LTE), to a second RAT, such as new radio (NR). With DSS, NR and LTE may share the same spectrum by reframing existing LTE frequency division duplexed (FDD) bands to deploy NR. The shared spectrum is dynamically assigned based on traffic conditions in each technology.

Figure 4:
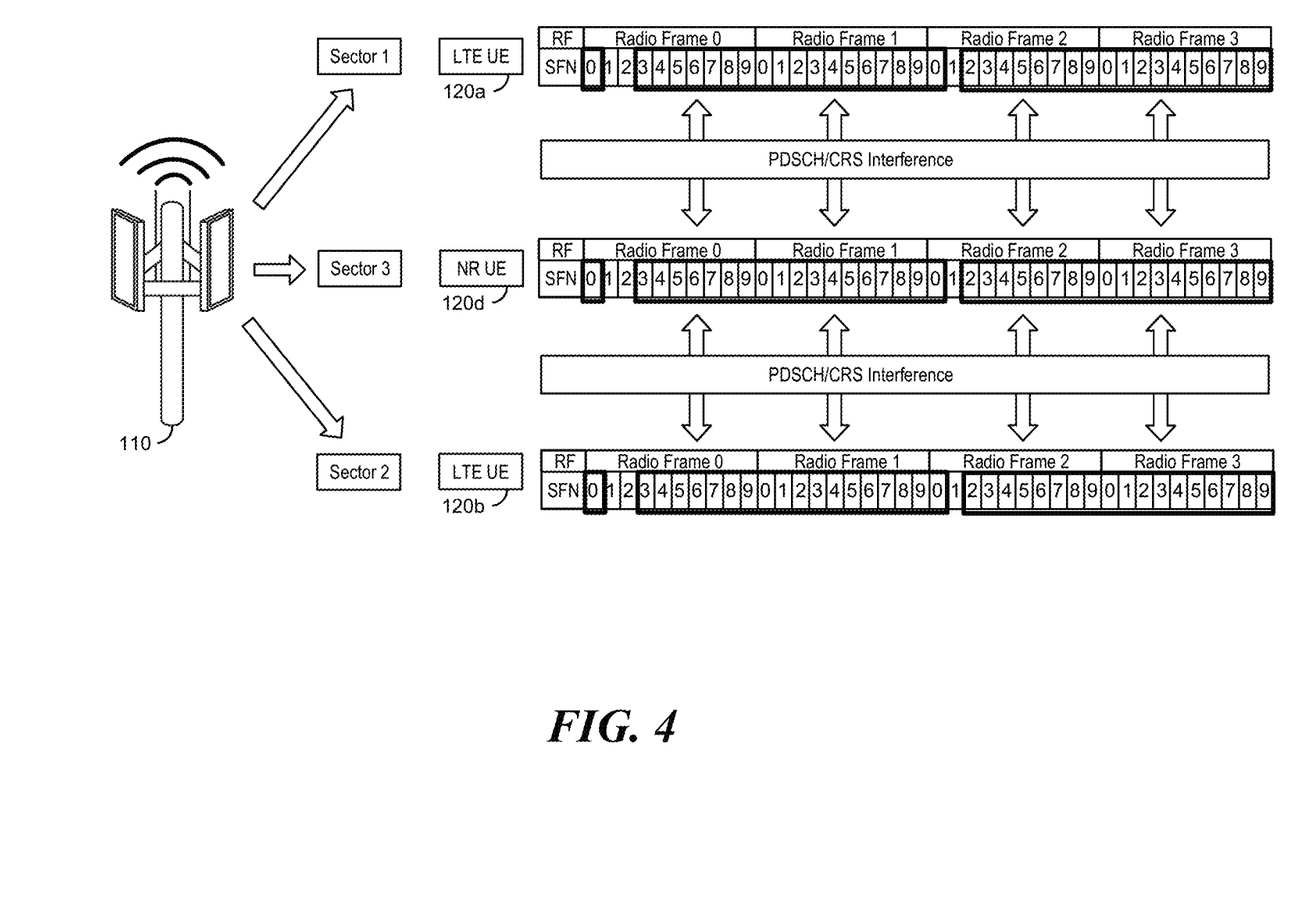
FIG. 4 is a block diagram illustrating dynamic spectrum sharing (DSS) between new radio (NR) and long term evolution (LTE), in accordance with aspects of the present disclosure.

FIG. 4 is a block diagram illustrating dynamic spectrum sharing (DSS) between NR and LTE, in accordance with aspects of the present disclosure. In the example of FIG. 4, a base station 110 provides coverage to three sectors: sector 1 and sector 2, which are LTE cells, and sector 3, which is an NR cell. A first LTE UE 120*a* operates in sector 1, a second LTE UE 120*b* operates in sector 2, and an NR UE 102*d* operates in sector 3. In each of the sectors of the example shown in FIG. 4, multicast broadcast single frequency network (MBSFN) subframes are transmitted in radio frame (RF) 0, system frame number (SFN) 1 and 2, as well as radio frame 2, SFN 1. At the non-MBSFN subframes, communications from sectors 1 and 2 may interfere with communications in sector 3. For example, cell specific reference signal (CRS) patterns transmitted in sectors 1 and 2, as well as physical downlink shared channels (PDSCH)

transmitted in each sector may cause the interference. The CRS patterns may be transmitted in sectors 1 and 3 at subframe 0.

Figure 5:
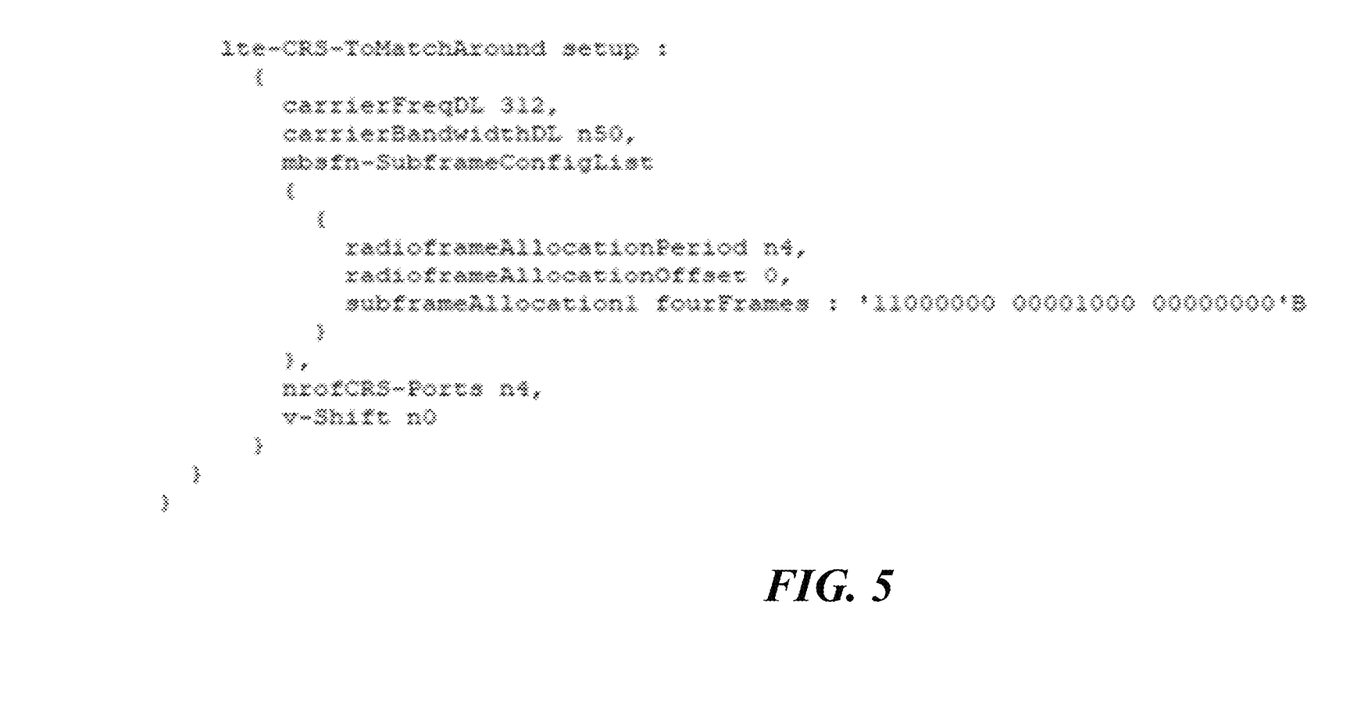
FIG. 5 illustrates an lte-CRS-ToMatchAround information element, in accordance with aspects of the present disclosure.

To enable DSS, a UE advertises to the network the UE's support for DSS. The UE may indicate the support via UE capability radio resource control (RRC) signaling of an information element (IE), such as the rateMatchingLTE-CRS information element. If the network does not have available dedicated spectrum for NR, the network configures the relevant parameters for DSS operation in response to learning of the UE's support for DSS. The network may configure the UE via the lte-CRS-ToMatchAround information element in RRC reconfiguration signaling messages. The relevant parameters may include an MBSFN configuration (e.g., location and repetition of MBSFN subframes), LTE bandwidth for the cell, LTE frequency for the cell, etc. FIG. 5 illustrates an lte-CRS-ToMatchAround information element, in accordance with aspects of the present disclosure. In the example of FIG. 5, the MBSFN configuration indicates that MBSFN transmission occurs in subframes 1 and 2, the number of CRS ports are four LTE CRS antenna ports, the frequency shift parameter (vShift) is LTE CRS v-shift nO, the carrier frequency is downlink is 4.68 MHz away from reference point A, and the carrier bandwidth of LTE is 10 MHZ NR networks transmit synchronization signal blocks (SSBs) to enable UEs to synchronize with the NR network. Each SSB of a set of SSBs may be configured for transmission in a particular subframe. For example, SSB 0 and SSB 1 may be assigned for transmission in subframe 0, while SSB 2 and SSB 3 may be assigned for transmission in subframe 1.

When the NR network is operating with DSS for either standalone (SA) mode or non-standalone (NSA) mode, the NR network may not be able to transmit all of its SSBs. When sharing spectrum with LTE using DSS, the NR cell can only transmit the set of SSBs that fall in the MBSFN subframes. This is a specification for DSS operation due to priority of certain LTE signaling. For example, if a particular frequency division duplexed (FDD) NR cell is configured to operate with DSS, the NR cell may only be able to transmit two or three SSBs when a maximum of four SSBs are potentially transmitted by the NR cell. That is, the LTE network may be transmitting signals in certain subframes, preventing the NR cell from transmitting SSBs in those subframes. For example, the LTE network transmits a CRS, primary synchronization signal (PSS), and secondary synchronization signal (SSS) in subframe 0. Because LTE has priority in subframe 0, the NR cell cannot transmit any SSBs in that subframe. Although the present description assumes a maximum of four SSBs, the present disclosure is not so limited, as more or fewer SSBs may be permitted.

The network may configure the UE to measure intra-frequency cells and then send measurement reports for those intra-frequency cells. The network can transmit the configuration information to the UE via RRC signaling by including the cell frequency, synchronization signal and physical broadcast channel (SS/PBCH) block measurement timing configuration (SMTC) information, etc. The UE, upon reception of the RRC signaling, performs cell searches and measurements based on the received timing and frequency information. If the conditions and thresholds for the cell measurements are met, the UE transmits a measurement report to the network.

If the network does not configure the UE with an optional ssb-ToMeasure field when requesting the cell search, the UE performs a search and measurement on all SSBs. Performing a cell search on SSBs that are not transmitted by the network is undesirable, however, and leads to unwanted processing and a waste of power. That is, if a UE attempts to decode SSBs that are not present, the UE performs unnecessary cell searches.

According to aspects of the present disclosure, a UE refrains from performing cell searches on any SSBs that are not transmitted by the network when operating in DSS mode. For example, if NR cell A is operating in DSS mode with MBSFN configured for subframe 1, the only SSBs the network transmits are SSBs with indexes 2 and 3 (SSB=2,3) because SSB=2,3 are assigned to subframe 1. The SSBs with indexes 0 and 1 (SSB=0,1) are assigned to subframe 0. In this example, the LTE network transmits priority signals in subframe 0, preventing the NR network from using subframe 0 for SSB transmission. If NR cell A requests the UE to perform intra-frequency searches on the NR cell B, it is likely that NR cell B would also not be transmitting SSB-0,1. By avoiding detecting SSB=0,1, which the NR cell B does not transmit, the UE does not perform cell measurement on SSB=0,1 of NR cell B. As a result, power savings is achieved by the UE.

Figure 6:
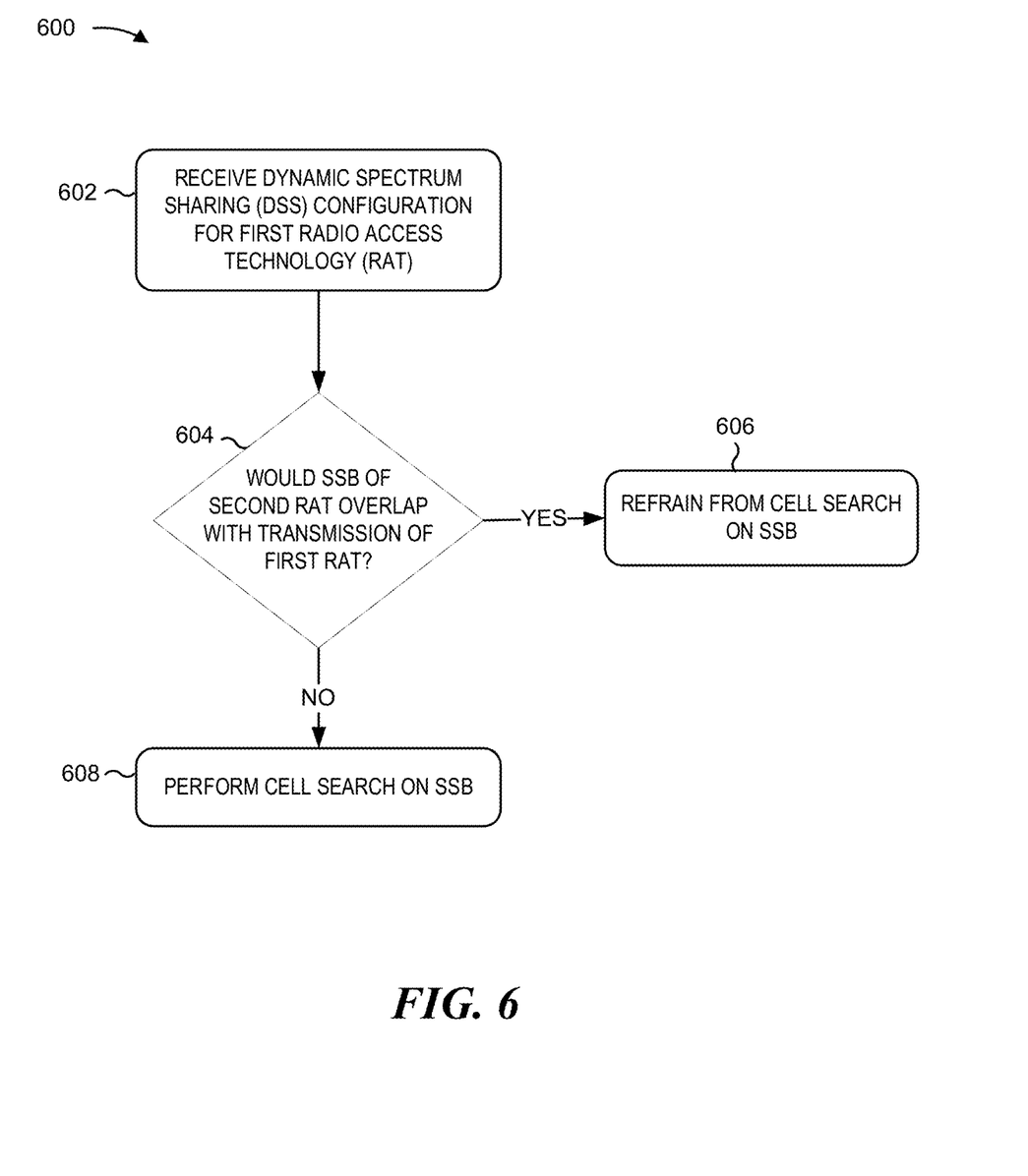
FIG. 6 is a flow diagram illustrating an example process for an enhanced cell search during dynamic spectrum sharing (DSS) operation, in accordance with various aspects of the present disclosure.

FIG. 6 is a flow diagram illustrating an example process 600 for an enhanced cell search during dynamic spectrum sharing (DSS) operation, in accordance with various aspects of the present disclosure. At block 602, a UE receives a DSS configuration for a first RAT, such as LTE. The configuration includes an MBSFN configuration, which indicates where a set of SSBs of a second RAT may be transmitted. The second RAT may be NR. The set of SSBs may include one or more SSBs. The configuration also indicates that the UE should measure on all SSBs. At block 604, the UE determines for each possible SSB whether the SSB would overlap or collide with a transmission in the first RAT. The determination may be based on the MBSFN configuration, for example. If the UE determines there would be an overlap, at block 606 the UE refrains from performing a cell search on that SSB. If the UE determines there would be no overlap, at block 608 the UE performs a cell search on that SSB. By refraining from performing cell searches and measurements on SSBs that are not transmitted by the network, the UE saves processing power (e.g., million instructions per second (MIPS)) by avoiding unwanted cell searches.

As indicated above, FIGS. 4-6 are provided as examples. Other examples may differ from what is described with respect to FIGS. 4-6.

Figure 7:
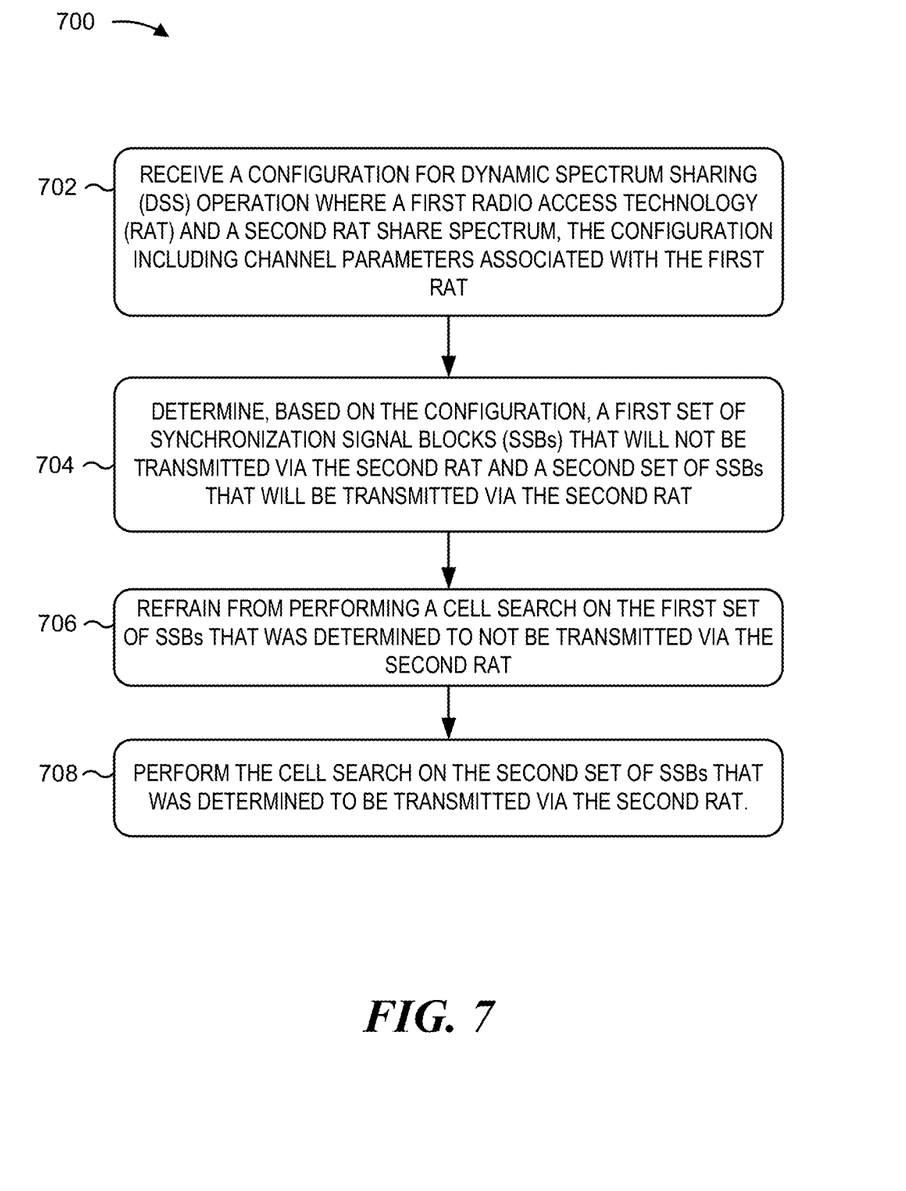
FIG. 7 is a flow diagram illustrating an example process performed, for example, by a user equipment (UE), in accordance with various aspects of the present disclosure.

FIG. 7 is a flow diagram illustrating an example process 700 performed, for example, by a user equipment (UE), in accordance with various aspects of the present disclosure. The example process 700 is an example of cell search during dynamic spectrum sharing (DSS). The operations of the process 700 may be implemented by a UE 120.

At block 702, the user equipment (UE) receives a configuration for dynamic spectrum sharing (DSS) operation where a first radio access technology (RAT) and a second RAT share spectrum. The configuration includes channel parameters associated with the first RAT. For example, the UE (e.g., using the antenna 252, DEMOD/MOD 254, MIMO detector 256, receive processor 258, controller/processor 280 and/or memory 282) may receive the configuration. In some aspects, the configuration indicates a frequency, a bandwidth, and a multicast broadcast single frame network (MBSFN) configuration for the first RAT. The configuration may be received in an lte-CRS-ToMatchAround information element of a radio resource control (RRC) message.

At block 704, the user equipment (UE) determines, based on the configuration, a first set of synchronization signal blocks (SSBs) that will not be transmitted via the second RAT and a second set of SSBs that will be transmitted via the second RAT. For example, the UE (e.g., using the controller/processor 280 and/or memory 282) may determine the SSBs. In some aspects, the determining is based on the MBSFN configuration.

At block 706, the user equipment (UE) refrains from performing a cell search on the first set of SSBs that was determined to not be transmitted via the second RAT. For example, the UE (e.g., using the controller/processor 280 and/or memory 282) may refrain from performing a cell search. At block 708, the user equipment (UE) performs the cell search on the second set of SSBs that was determined to be transmitted via the second RAT. For example, the UE (e.g., using the controller/processor 280 and/or memory 282) may perform the cell search. In some aspects, the first RAT is long term evolution (LTE) and the second RAT is new radio (NR).

EXAMPLE ASPECTS

Aspect 1: A method of wireless communication by a user equipment (UE), comprising: receiving a configuration for dynamic spectrum sharing (DSS) operation where a first radio access technology (RAT) and a second RAT share spectrum, the configuration including channel parameters associated with the first RAT; determining, based on the configuration, a first set of synchronization signal blocks (SSBs) of a plurality of SSBs that will not be transmitted via the second RAT and a second set of SSBs of the plurality of SSBs that will be transmitted via the second RAT; refraining from performing a cell search on the first set of SSBs that was determined to not be transmitted via the second RAT; and performing the cell search on the second set of SSBs that was determined to be transmitted via the second RAT.

Aspect 2: The method of Aspect 1, in which the configuration indicates a frequency, a bandwidth, and a multicast broadcast single frame network (MBSFN) configuration for the first RAT.

Aspect 3: The method of Aspect 1 or 2, further comprising receiving the configuration in an lte-CRS-ToMatchAround information element of a radio resource control (RRC) message.

Aspect 4: The method of any of the preceding Aspects, in which the determining is based on the MBSFN configuration.

Aspect 5: The method of any of the preceding Aspects, in which the first RAT is long term evolution (LTE) and the second RAT is new radio (NR).

Aspect 6: The method of any of the preceding Aspects, further comprising reporting, to a network, a measurement report based on performing the cell search on the second set of SSBs.

Aspect 7: An apparatus for wireless communication by a user equipment (UE), comprising: a memory; and at least one processor coupled to the memory, the at least one processor configured: to receive a configuration for dynamic spectrum sharing (DSS) operation where a first radio access technology (RAT) and a second RAT share spectrum, the configuration including channel parameters associated with the first RAT; to determine, based on the configuration, a first set of synchronization signal blocks (SSBs) of a plurality of SSBs that will not be transmitted via the second RAT and a second set of SSBs of the plurality of SSBs that will be transmitted via the second RAT; to refrain from performing a cell search on the first set of SSBs that was determined to not be transmitted via the second RAT; and to perform the cell search on the second set of SSBs that was determined to be transmitted via the second RAT.

Aspect 8: The apparatus of Aspect 7, in which the configuration indicates a frequency, a bandwidth, and a multicast broadcast single frame network (MBSFN) configuration for the first RAT.

Aspect 9: The apparatus of Aspect 7 or 8, in which the at least one processor is further configured to receive the configuration in an lte-CRS-ToMatchAround information element of a radio resource control (RRC) message.

Aspect 10: The apparatus of any of the Aspects 7-9, in which the at least one processor determines the first set of SSBs and the second set of SSBs based on the MBSFN configuration.

Aspect 11: The apparatus of any of the Aspects 7-10, in which the first RAT is long term evolution (LTE) and the second RAT is new radio (NR).

Aspect 12: The apparatus of any of the Aspects 7-11, in which the at least one processor is further configured to report, to a network, a measurement report based on performing the cell search on the second set of SSBs.

Aspect 13: An apparatus for wireless communication by a user equipment (UE), comprising: means for receiving a configuration for dynamic spectrum sharing (DSS) operation where a first radio access technology (RAT) and a second RAT share spectrum, the configuration including channel parameters associated with the first RAT; means for determining, based on the configuration, a first set of synchronization signal blocks (SSBs) of a plurality of SSBs that will not be transmitted via the second RAT and a second set of SSBs of the plurality of SSBs that will be transmitted via the second RAT; means for refraining from performing a cell search on the first set of SSBs that was determined to not be transmitted via the second RAT; and means for performing the cell search on the second set of SSBs that was determined to be transmitted via the second RAT.

Aspect 14: The apparatus of Aspect 13, in which the configuration indicates a frequency, a bandwidth, and a multicast broadcast single frame network (MBSFN) configuration for the first RAT.

Aspect 15: The apparatus of Aspect 13 or 14, further comprising means for receiving the configuration in an lte-CRS-ToMatchAround information element of a radio resource control (RRC) message.

Aspect 16: The apparatus of any of the Aspects 13-15, in which the means for determining determines based on the MBSFN configuration.

Aspect 17: The apparatus of any of the Aspects 13-16, in which the first RAT is long term evolution (LTE) and the second RAT is new radio (NR).

Aspect 18: The apparatus of any of the Aspects 13-17, further comprising means for reporting, to a network, a measurement report based on performing the cell search on the second set of SSBs.

Aspect 19: A non-transitory computer-readable medium having program code recorded thereon, the program code executed by a processor and comprising: program code to receive a configuration for dynamic spectrum sharing (DSS) operation where a first radio access technology (RAT) and a second RAT share spectrum, the configuration including channel parameters associated with the first RAT: program code to determine, based on the configuration, a first set of synchronization signal blocks (SSBs) of a plurality of SSBs that will not be transmitted via the second RAT and a second set of SSBs of the plurality of SSBs that will be transmitted via the second RAT; program code to refrain from performing a cell search on the first set of SSBs that was determined to not be transmitted via the second RAT; and program code to perform the cell search on the second set of SSBs that was determined to be transmitted via the second RAT.

Aspect 20: The non-transitory computer-readable medium of Aspect 19, in which the configuration indicates a frequency, a bandwidth, and a multicast broadcast single frame network (MBSFN) configuration for the first RAT.

Aspect 21: The non-transitory computer-readable medium of Aspect 19 or 20, in which the program code further comprises program code to receive the configuration in an lte-CRS-ToMatchAround information element of a radio resource control (RRC) message.

Aspect 22: The non-transitory computer-readable medium of any of the Aspects 19-21, in which the program code to determine determines based on the MBSFN configuration.

Aspect 23: The non-transitory computer-readable medium of any of the Aspects 19-22, in which the first RAT is long term evolution (LTE) and the second RAT is new radio (NR).

Aspect 24: The non-transitory computer-readable medium of any of the Aspects 19-23, in which the program code further comprises program code to report, to a network, a measurement report based on performing the cell search on the second set of SSBs.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a user equipment (UE), comprising:
   receiving a configuration for dynamic spectrum sharing (DSS) operation where a first radio access technology (RAT) and a second RAT share spectrum, the configuration including channel parameters associated with the first RAT;
   determining, from the configuration, a first set of synchronization signal blocks (SSBs) of a plurality of SSBs that will not be transmitted via the second RAT and a second set of SSBs of the plurality of SSBs that will be transmitted via the second RAT;
   refraining from performing a cell search on the first set of SSBs that was determined to not be transmitted via the second RAT; and
   performing the cell search on the second set of SSBs that was determined to be transmitted via the second RAT.

2. The method of claim 1, in which the configuration indicates a frequency, a bandwidth, and a multicast broadcast single frame network (MBSFN) configuration for the first RAT.

3. The method of claim 2, further comprising receiving the configuration in an lte-CRS-ToMatchAround information element of a radio resource control (RRC) message.

4. The method of claim 2, in which the determining is based on the MBSFN configuration.

5. The method of claim 1, in which the first RAT is long term evolution (LTE) and the second RAT is new radio (NR).

6. The method of claim 1, further comprising reporting, to a network, a measurement report based on performing the cell search on the second set of SSBs.

7. An apparatus for wireless communication by a user equipment (UE), comprising:
   a memory; and
   at least one processor coupled to the memory, the at least one processor configured:
   to receive a configuration for dynamic spectrum sharing (DSS) operation where a first radio access technology (RAT) and a second RAT share spectrum, the configuration including channel parameters associated with the first RAT;

to determine, from the configuration, a first set of synchronization signal blocks (SSBs) of a plurality of SSBs that will not be transmitted via the second RAT and a second set of SSBs of the plurality of SSBs that will be transmitted via the second RAT;

to refrain from performing a cell search on the first set of SSBs that was determined to not be transmitted via the second RAT; and to perform the cell search on the second set of SSBs that was determined to be transmitted via the second RAT.

8. The apparatus of claim 7, in which the configuration indicates a frequency, a bandwidth, and a multicast broadcast single frame network (MBSFN) configuration for the first RAT.

9. The apparatus of claim 8, in which the at least one processor is further configured to receive the configuration in an lte-CRS-ToMatchAround information element of a radio resource control (RRC) message.

10. The apparatus of claim 8, in which the at least one processor determines the first set of SSBs and the second set of SSBs based on the MBSFN configuration.

11. The apparatus of claim 7, in which the first RAT is long term evolution (LTE) and the second RAT is new radio (NR).

12. The apparatus of claim 7, in which the at least one processor is further configured to report, to a network, a measurement report based on performing the cell search on the second set of SSBs.

13. An apparatus for wireless communication by a user equipment (UE), comprising:

means for receiving a configuration for dynamic spectrum sharing (DSS) operation where a first radio access technology (RAT) and a second RAT share spectrum, the configuration including channel parameters associated with the first RAT;

means for determining, from the configuration, a first set of synchronization signal blocks (SSBs) of a plurality of SSBs that will not be transmitted via the second RAT and a second set of SSBs of the plurality of SSBs that will be transmitted via the second RAT;

means for refraining from performing a cell search on the first set of SSBs that was determined to not be transmitted via the second RAT; and means for performing the cell search on the second set of SSBs that was determined to be transmitted via the second RAT.

14. The apparatus of claim 13, in which the configuration indicates a frequency, a bandwidth, and a multicast broadcast single frame network (MBSFN) configuration for the first RAT.

15. The apparatus of claim 14, further comprising means for receiving the configuration in an lte-CRS-ToMatchAround information element of a radio resource control (RRC) message.

16. The apparatus of claim 14, in which the means for determining determines based on the MBSFN configuration.

17. The apparatus of claim 13, in which the first RAT is long term evolution (LTE) and the second RAT is new radio (NR).

18. The apparatus of claim 13, further comprising means for reporting, to a network, a measurement report based on performing the cell search on the second set of SSBs.

19. A non-transitory computer-readable medium having program code recorded thereon, the program code executed by a processor and comprising:

program code to receive a configuration for dynamic spectrum sharing (DSS) operation where a first radio access technology (RAT) and a second RAT share spectrum, the configuration including channel parameters associated with the first RAT;

program code to determine, from the configuration, a first set of synchronization signal blocks (SSBs) of a plurality of SSBs that will not be transmitted via the second RAT and a second set of SSBs of the plurality of SSBs that will be transmitted via the second RAT;

program code to refrain from performing a cell search on the first set of SSBs that was determined to not be transmitted via the second RAT; and program code to perform the cell search on the second set of SSBs that was determined to be transmitted via the second RAT.

20. The non-transitory computer-readable medium of claim 19, in which the configuration indicates a frequency, a bandwidth, and a multicast broadcast single frame network (MBSFN) configuration for the first RAT.

21. The non-transitory computer-readable medium of claim 20, in which the program code further comprises program code to receive the configuration in an lte-CRS-ToMatchAround information element of a radio resource control (RRC) message.

22. The non-transitory computer-readable medium of claim 20, in which the program code to determine determines based on the MBSFN configuration.

23. The non-transitory computer-readable medium of claim 19, in which the first RAT is long term evolution (LTE) and the second RAT is new radio (NR).

24. The non-transitory computer-readable medium of claim 19, in which the program code further comprises program code to report, to a network, a measurement report based on performing the cell search on the second set of SSBs.

* * * * *